(12) United States Patent
Hévizi et al.

(10) Patent No.: US 10,050,826 B2
(45) Date of Patent: Aug. 14, 2018

(54) OUTAGE COMPENSATION IN A CELLULAR NETWORK

(71) Applicant: Telefonaktiebolaget LM Ericsson (publ), Stockholm (SE)

(72) Inventors: László Hévizi, Piliscsaba (HU); András Rácz, Budapest (HU); Paul Stjernholm, Lidingö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/522,000

(22) PCT Filed: Sep. 4, 2015

(86) PCT No.: PCT/EP2015/070203
§ 371 (c)(1),
(2) Date: Apr. 26, 2017

(87) PCT Pub. No.: WO2016/071023
PCT Pub. Date: May 12, 2016

(65) Prior Publication Data
US 2017/0317873 A1    Nov. 2, 2017

(30) Foreign Application Priority Data
Nov. 6, 2014  (EP) .................................... 14192100

(51) Int. Cl.
*H04L 12/24*    (2006.01)
*H04W 24/04*    (2009.01)

(52) U.S. Cl.
CPC ...... *H04L 41/0663* (2013.01); *H04L 41/0672* (2013.01); *H04L 41/0681* (2013.01);
(Continued)

(58) Field of Classification Search
CPC ............. H04L 41/0663; H04L 41/0672; H04L 41/0681; H04L 41/147; H04L 41/16;
(Continued)

(56) References Cited

U.S. PATENT DOCUMENTS 6,085,335 A    7/2000  Djoko
7,219,123 B1 *  5/2007  Fiechter ............ H04M 1/72561
                                       704/E15.045
(Continued)

*Primary Examiner* — Robert J Lopata
(74) *Attorney, Agent, or Firm* — Sage Patent Group

(57) ABSTRACT

The invention comprises a method for controlling an outage of a network element (300) in a cellular network (40) using an outage database (130), the outage database containing for each of a plurality of the network elements (300) controlled by the cellular network at least the following network element dependent information: first operating parameters describing an error free operation of the corresponding network element, outage detection rules indicating when a outage for the corresponding network element is present, outage compensation rules indicating how the outage of the corresponding network element should be compensated, the outage compensation rules including compensation parameters to be used by compensating network elements (300b-300g) in order to compensate the outage of one of the network elements (300a). The method comprises the steps of: continuously receiving current operating parameters for a plurality of network elements (300), updating the first operating parameters and the outage detection rules for the plurality of network elements taking into account the current operating parameters, detecting an outage for one of the network elements by comparing the received current operating parameters to the outage detection rules for said one network element, wherein if an outage is detected for said one network element, determining and applying the outage compensation rules for said one network element (300a), wherein applying the compensation rules includes optimizing the compensation parameters in order to calculate optimized operating parameters for the compensating network
(Continued)

elements (300b-300g) used to compensate for the outage of said one network element, evaluating the application of the compensation rules, and storing the optimized operating parameters in the compensation rules as starting parameters for a future optimization of the compensation parameters in case of an outage of said one network element in dependence on the evaluation.

20 Claims, 8 Drawing Sheets

(52) U.S. Cl.
CPC ............ *H04L 41/147* (2013.01); *H04L 41/16* (2013.01); *H04W 24/04* (2013.01)

(58) Field of Classification Search
CPC ............. H04L 41/0654; H04L 41/0659; H04L 41/0668; H04L 45/22; H04L 45/28; H04W 24/04
USPC ......................................................... 370/216
See application file for complete search history.

(56) References Cited

U.S. PATENT DOCUMENTS

| | | | |
|---|---|---|---|
| 8,526,299 B2* | 9/2013 | Ni | H04W 24/04 370/221 |
| 9,363,727 B2* | 6/2016 | Chou | H04W 28/24 |
| 2004/0203440 A1 | 10/2004 | Katz | |
| 2008/0144488 A1* | 6/2008 | Tuulos | H04L 41/0681 370/216 |
| 2009/0010643 A1* | 1/2009 | DeLew | H04B 10/035 398/17 |
| 2009/0097397 A1* | 4/2009 | Moreira Sa de Souza | H04L 41/0636 370/216 |
| 2009/0138752 A1* | 5/2009 | Graham | G06F 9/45558 714/4.1 |
| 2010/0046379 A1* | 2/2010 | Goerge | H04L 41/044 370/242 |
| 2010/0103823 A1* | 4/2010 | Goerge | H04L 41/044 370/242 |
| 2011/0107155 A1 | 5/2011 | Hirose | |
| 2012/0106358 A1* | 5/2012 | Mishra | H04L 43/0817 370/242 |
| 2013/0051239 A1* | 2/2013 | Meredith | H04W 16/18 370/241 |
| 2014/0295856 A1* | 10/2014 | Chou | H04W 28/24 455/446 |
| 2014/0357259 A1* | 12/2014 | Tomeczko | H04W 24/04 455/423 |
| 2015/0382212 A1* | 12/2015 | Elliott | H04W 76/10 370/252 |
| 2017/0223556 A1* | 8/2017 | Elliott | H04W 24/02 |

* cited by examiner

OUTAGE COMPENSATION IN A CELLULAR NETWORK

TECHNICAL FIELD

The present invention relates to a method for controlling an outage of a network element in a cellular network and to the corresponding entity which is configured to control the outage of the network element.

BACKGROUND

In a cellular network, an outage of a network element or a cell can occur for several reasons, such as failures in the power supply, hardware or software errors. The problem related to outages of a cell in a cellular network has been under consideration for several years and the third Generation Partnership Project, 3GPP, deals with this topic in the framework of self-organizing networks (SON). In a self-organizing network, cell outage detection and compensation is part of a self-healing process as described in 3GPP TS 32.541.

M. Amirijoo, L. Jorguseski et al. describe in an FP7 SOCRATES project in <<Cell Outage Management in LTE Networks>> the difficulties that arise in detecting sleeping cell, when cells show symptoms of malfunctioning without explicitly declaring alarm. Furthermore, there is no uniform cell outage compensation solution to all cells, deployments and traffic scenarios. Different network operators may have different optimization goals and network self-healing policies. The traffic and deployment particulars of the cells and their neighbours all influence the potential of cell outage detection and compensation.

Up to now, research has been focusing on the theory of cell outage detection and compensation. The used methods balance between the accuracy and trigger time of detection and they are typically based on statistics. On the other hand, the suggested compensation methods involve multivariate optimization, which also involves a trade-off between convergence, accuracy and time. A cell outage can be the end stage of a gradual performance degradation, but it rather happens all of a sudden. When a cell outage occurs, the network management has to take prompt remedy actions, there is no time to start a relatively slow optimization process, which may not even converge to full compensation.

In view of the above said, a need exists to further improve a cell outage detection and to speed up the outage compensation.

SUMMARY

This need is met by the features of the independent claims. Additional aspects are described in the dependent claims.

According to a first aspect, a method for controlling an outage of a network element in a cellular network is provided using an outage database. The outage database contains, for each of a plurality of network elements controlled by the cellular network, at least the following network elements dependent information: the outage database comprises first operating parameters describing an error-free operation of the corresponding network elements. The outage database furthermore comprises outage detection rules indicating when an outage for the corresponding network element is present. Furthermore, outage compensation rules are provided in the outage database indicating how the outage of the corresponding network element should be compensated, wherein the outage compensation rules include compensation parameters to be used by compensating network elements in order to compensate for the outage of one of the network elements. The method comprises the step of continuously receiving current operating parameters for a plurality of network elements. Additionally, the first operating parameters and the outage detection rules for the plurality of network elements are updated taking into account the current operating parameters. An outage for one of the network elements is detected by comparing the received current operating parameters to the outage detection rules for said one network element. If an outage is detected for said one network element, the outage compensation rules for said one network element are determined and applied. The applying of the compensation rules includes optimizing the compensation parameters in order to calculate optimized operating parameters for the compensating network elements used to compensate for the outage of said one network element. The application of the compensation rules are evaluated and the optimized operating parameters are stored in the compensation rules as starting parameters for a future optimization of the compensation parameters in case of an outage of said one network element in dependence of the evaluation.

With the use of the outage database, the detection of an outage of a network element is improved. This is achieved inter alia by continuously updating the first operating parameters and the outage detection rules taking into account the current operating parameters. Based on the current traffic situation in the cellular network, the rules that are used to detect a non-working element are up to date so that an operating parameter, which may be interpreted as an operating parameter for a network element in outage, is interpreted as a network element working in an error-free way for one traffic situation in the cellular network, whereas in another traffic situation, the same operating parameter may confirm an actual outage of the network element. Furthermore, the outage compensation is improved as the application of the compensation rules is evaluated and if the outcome of the evaluation is positive, the optimized operating parameters are stored in the compensation rules as starting operating parameters for future optimization. By way of example, the evaluation may be positive when network parameters such as coverage, cell load, radio link failure and intercell interference have improved after the compensation (but before the network element in outage has recovered) compared to the situation after the outage was detected and before the compensation was carried out. In the presently claimed method, the database learns from information learned from previous outage situations. By way of example, the learned information can include information such as the form of antenna beams used by the compensating network elements in order to compensate for the outage of a cell, the used transmit power of network elements, the neighbor list or intra and inter RAT handover margin adjustments.

According to a further aspect, a corresponding entity configured to control the outage of a network element is provided, the entity containing the above-discussed outage database with the first operating parameters, the outage detection rules and the outage compensation rules. A receiver of the entity is configured to continuously receive the current operating parameters for a plurality of network elements and a processing unit of the entity is configured to update the first operating parameters and the outage detection rules for the plurality of network elements taking into account the current operating parameters. The processing unit is adapted to detect an outage for one of the network elements as discussed above, inter alia by comparing the received current operating parameters to the outage detection rules for said one operating parameter. If the processing unit then detects an outage for said one network element, the processing unit is configured to determine and apply the outage compensation rules for said one network element. When the processing unit applies the compensation rules, it optimizes the compensation parameters in order to calculate optimized operating parameters for the compensating network elements used to compensate for the outage of said one network element. The processing unit is furthermore configured to evaluate the application of the compensation rules and to store the optimized operating parameters in the compensation rules as starting parameters for a future optimization of the compensation parameters in dependence on the evaluation.

When compensation is triggered, the main concern in most cases is if network coverage can be reinstated. The relative number of dropped calls, data sessions and handover failures are in the focus of performance evaluation. Then the next level of evaluation monitors the field measurements and channel quality that are reported by the user terminals.

In case of capacity-oriented optimization, e.g. an LTE site is lost but sufficient 3G coverage exists in the area, then the remaining active LTE cells can be focused to high-traffic areas. Then the spectral efficiency of connections can be the input parameter to network capacity optimization.

The invention furthermore relates to a computer program comprising program code to be executed by at least one processing unit of the entity, wherein the execution of the program causes the at least one processing unit to perform inter alia the above-discussed steps. Furthermore, a computer program product comprising the program code to be executed by the processing unit of the entity is provided.

Further features and advantages of the present invention will now be described with reference to the accompanying drawings.

DETAILED DESCRIPTION OF EMBODIMENTS

Figure 1:
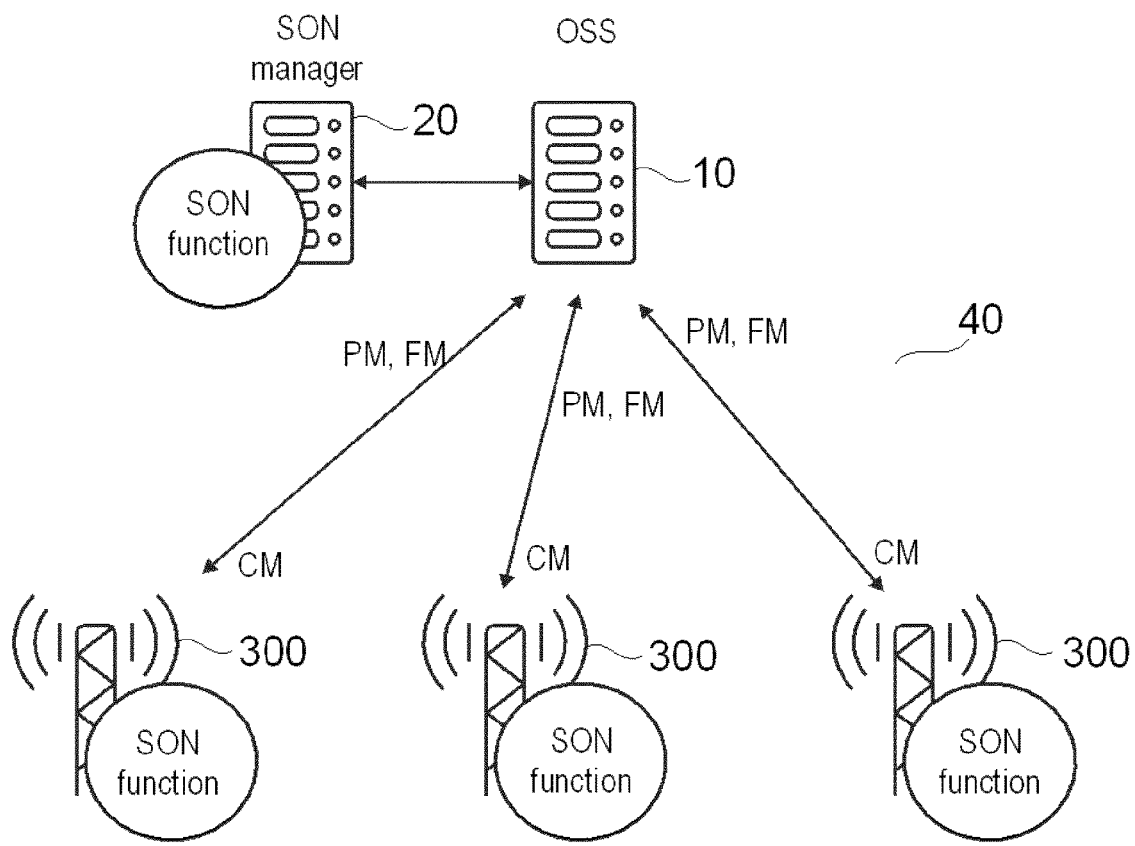
FIG. 1 schematically shows an overview over a cellular network which uses features of a self-organizing network (SON).

Features mentioned above and features yet to be explained may not only be used in isolation or in combination as explicitly indicated, but also in other combinations. Features in the embodiments of the present invention may be combined unless explicitly mentioned otherwise. In the following, embodiments of the invention will be described in detail with reference to the accompanying drawings. The drawings are to be regarded as being schematic representations, and elements illustrated in the drawings are not necessarily shown to scale. Rather, the various elements are represented such that their function and general purpose becomes apparent for a person skilled in the art. The connection or coupling between functional blocks, devices, components or other physical or functional units shown in the drawings or described herein may be implemented by a direct or an indirect connection or coupling. A coupling between components may be established over a wireless connection or wired connection. Functional blocks may be implemented in hardware, firmware, software, or a combination thereof.

FIG. 1 shows part of a cellular network which is organized as a self-organizing network. The cellular network comprises an operation support system (OSS) 10 which provides management functions such as network configuration and fault management. The OSS 10 is in communication with a SON manager 20, which comprises the SON function. Furthermore, the cellular network comprises a plurality of network elements 300 such as base stations, user equipments, antennas or cells. The network elements are managed network elements, meaning that they are managed by the cellular network. In the embodiment shown, each base station or network element 300 has its own SON function. Data comprising performance management (PM) data, fault management (FM) data such as alarm events and configuration management (CM) data including events related to configuration changes are acquired by the different network elements 300 and transmitted to OSS 10.

Figure 2:
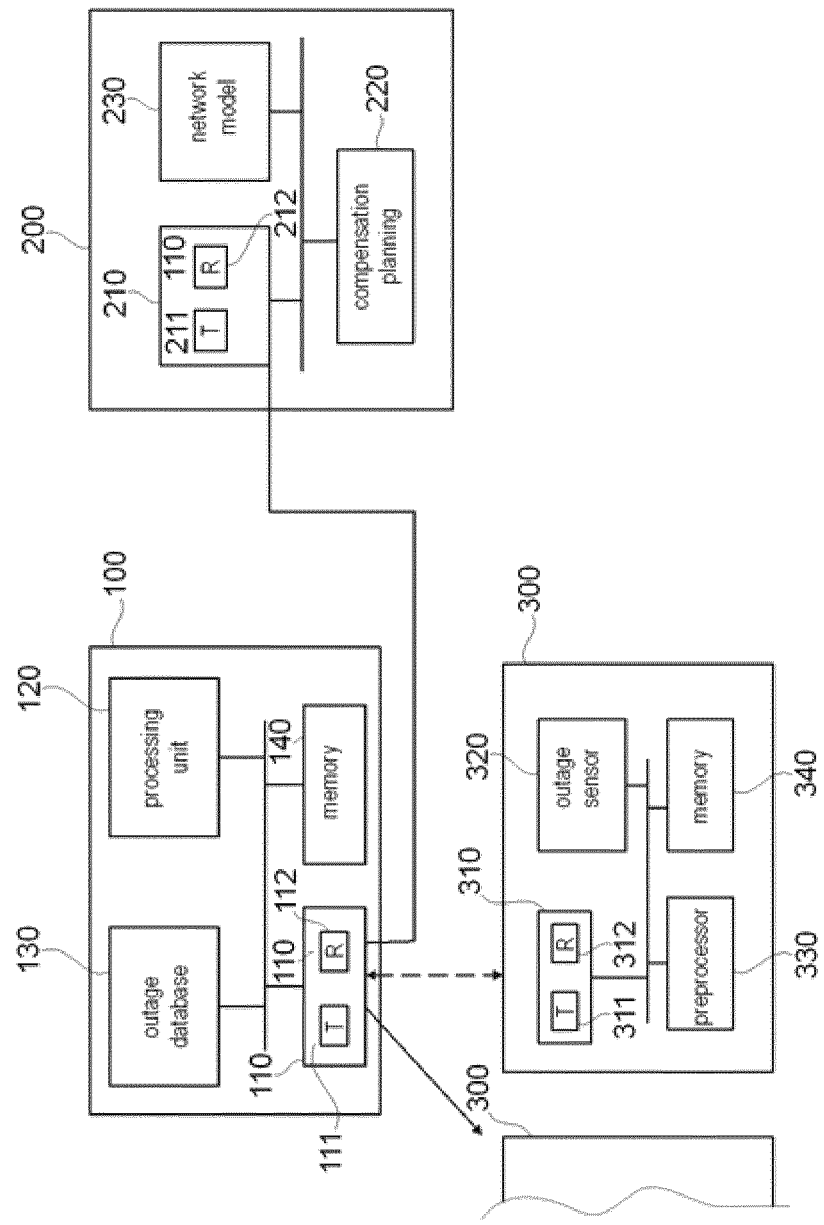
FIG. 2 is a schematic block diagram of an entity controlling an outage of a network element the entity interacting with base stations and a network planning tool.

The OSS 10 comprises, as shown inter alia in FIG. 2, a network management subsystem including an entity 100, which controls the outage of one of the network elements 300. The entity uses an outage database 130 which is set up in the network management domain, where rules and parameters or policies are ordered to individual cells, base stations or other managed network elements as well as to different combinations or sets of managed network elements. The policies stored in the outage database 130 govern outage detection and compensation, and once a failure or an outage of a network element occurs, the relevant rules, configuration settings and parameters are looked up from this outage database in order to promptly take remedy actions, which may resolve or mitigate the impact of the failure or outage.

The outage database 130 is not static. The information in this database is continuously updated as knowledge is accumulated from past measurements and from previous outage incidents to improve both the outage detection and the compensation functions. In order to improve the detection part, measurements of managed network elements are continuously collected in order to update the statistics upon which the detection of an outage is based. The sensitivity of the detection is adjusted in order to minimize the rates of false positive or false negative outage detections. The outage database uses the information learned from previous outage situations. By way of example, the information learned from previous outage situations may include the form of an antenna beam used for outage compensation, transmit power. These pieces of information may be available not just for individual services but for base stations and multi RAT sites. Moreover, an operator may prepare for outages which may affect several network nodes at the same time. As time goes by and the observations from the different network elements pile up, the outage detection rules and parameters indicating an outage can be more and more specific to individual cells and traffic scenarios. Furthermore, the outage compensation rules and compensation parameters are improved from the knowledge learned from previous cases and the optimized outage compensation parameters for the different network elements are stored in the outage database. The initial data of the outage database 130 can be automatically generated, e.g. via a network planning tool 200 which prepares backup configurations for hypothetical cell or base station failure scenarios.

The outage database comprises three major information groups.

The first group comprises the identity of the managed network elements. Furthermore, this group may contain a set of identifications. The identification or ID may be the search key for the database.

The second piece of information is related to outage detection such as outage detection rules indicating when an outage for a network element is present.

The third group contains outage compensation rules indicating how the outage of the corresponding network elements should be compensated for.

The first group including the identifications of the managed elements comprises the identities of one or more managed elements in outage, e.g. the identification of antennas, cells or radio base stations.

The second group relating to the outage detection rules contains information related to outage detection. This information defines the operator policies to apply for outage detection including definition of non-operation and specific detection rules and parameters to apply. For the definition of non-operation, first operating parameters describing an error-free operation of the network element may be provided. Parameters or thresholds that are related to observing anomalies such as sudden unusual changes are present, e.g. when a measured value or a KPI (Key Performance Indicator) rapidly changes or when a certain event occurs. These first operating parameters, the measured values and their statistics are typically seen at normal operation and help to define the acceptable domain for the monitored measurements or KPIs. The first operating parameters can include average daily profiles and the acceptable deviations from the profiles where the latter ones may depend on the desired sensitivity of outage detection. The first operating parameters may also include the statistics or measurements recorded by neighboring cells, but which are related to the network element or cell such as the reported hand-over candidates and RSRP (Reference Signal Received Power) measurement seen from neighboring cells.

Figure 8:
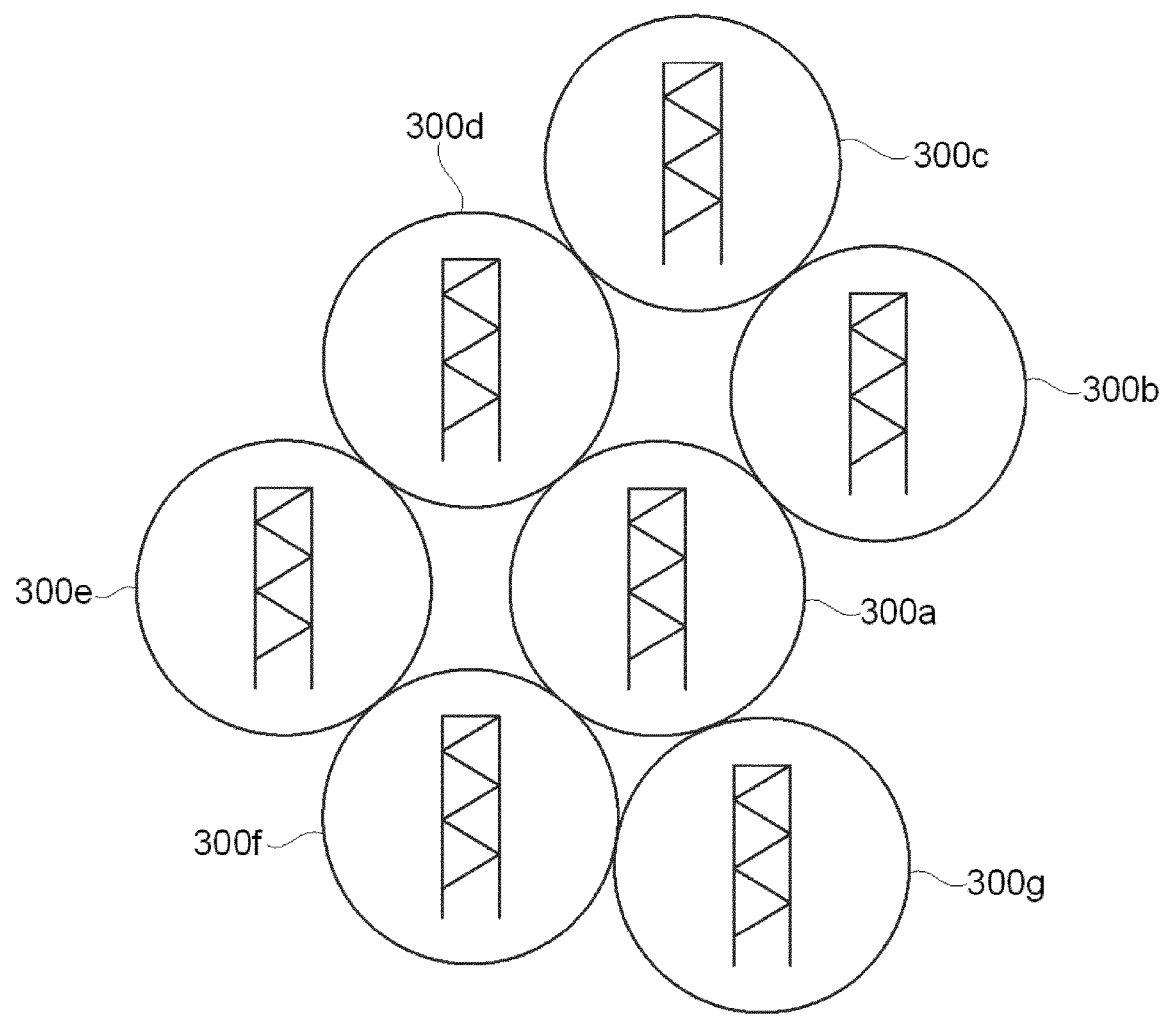
FIG. 8 is a schematic block diagram illustrating how other network elements compensate for the outage of one network element.

The third group relating to the outage compensation indicates how the outage of a network element should be compensated for. The outage compensation rules include inter alia compensation parameters to be used by compensating network elements in order to compensate for the outage of one of the network elements. The compensating network elements are the network elements which are used to compensate for the outage of a network element for which an outage has occurred. This is explained in connection with FIG. 8. In FIG. 8 it is assumed that a cell or base station 300*a* is in outage so that it cannot handle mobile traffic anymore. If a network element or a cell 300*a* is in outage, other cells have to compensate for this outage, in the examples the cells 300*b*-300*g* will adapt their parameters in such a way that the other cells 300*b*-300*g* compensate for the outage of cell 300*a*, e.g. by amending the antenna configurations of the base stations or the power settings so that the geographical region covered by cell 300*a* is at least partly covered by the compensating network elements 300*b*-300*g*.

The outage compensation rules define the operation policies to apply at outage compensation including the managed element specific rules and configuration sets. By way of example, the outage compensation rules can include the following elements. The outage compensation rules can indicate if the managed network element should be compensated for. By way of example, a cell providing primary coverage is to be compensated for whereas a cell providing additional capacity may not be compensated for. Furthermore, the information is provided for the different network elements if the corresponding network element is allowed to compensate. In other words, a network element or cell can be used to compensate for the outage of another cell, e.g. is the cell allowed to change its service coverage. By way of example, indoor cell may not be allowed to compensate for outdoor cells. Furthermore, the outage compensation rules may contain the information if intra RAT or inter RAT compensation is recommended or not. Furthermore, the information is provided which cells take part in the compensation, e.g. the neighboring cells. Furthermore, the outage compensation rules include the recommended configurations for the compensating network elements such as the antenna and power settings. Referring to FIG. 8, this would mean that for cell 300*a* the information is provided how the antenna and power settings of the other cells 300*b*-300*g* are amended in order to compensate for the outage of cell 300*a*. Furthermore, the outage compensation rules include parameters of the cost function used for optimization while the compensation is running. By way of example, the cost function can describe a function in such a way that either the coverage of the cell in outage or the capacity of the cell in outage should be optimized. By way of example, it may be assumed that the coverage area of a cell in outage should be covered in an optimum way by the compensating cells. In an optimization process, the compensating parameters such as antenna or power settings of the compensating network elements are optimized in such a way that the best coverage is obtained even though one of the cells is currently in outage. The above-discussed outage compensation rules can be traffic and hour-of-the-day dependent.

Referring back to FIG. 2, the entity 100 used for controlling the outage comprises the outage database 130 as described above. The entity 100 comprises an input/output unit 110 including a transmitter 111 and a receiver 112. The input/output unit 110 with the transmitter 111 and the receiver 112 describe the capability of the network element to communicate with other entities inside or outside the cellular network, the transmitter 111 being configured to transmit information to other entities, the receiver being configured to receive information from other entities.

A processing unit 120 is provided comprising one or more processors which are responsible for the operation of the entity 100. The processing unit 120 can generate the commands that are needed to carry out the above-discussed procedures of the entity 100 and of the procedures which will be discussed in more detail below. A memory 140, such as a read-only memory, a flash memory, a random access memory, a mass storage or the like, can store suitable program codes to be executed by the processing unit 120 so as to implement the functionalities of the entity controlling the outage. The entity 100 receives the current operating parameters from the network elements 300 such as the base station. The base station 300 comprises an input/output unit 310, a transmitter 311 and a receiver 312 used for communication with other entities such as the entity 100. The transmitter 311 can be used to transmit the current operating parameters of the base station. An outage sensor 320 may be provided which, based on the current operating parameters, detects that an outage is present and that the base station is capable of informing the entity 100 that an outage has occurred. A pre-processor 330 can pre-process the current operating parameters in order to transmit already pre-processed data to the entity 100. By way of example, the pre-processor 330 may accumulate data over a certain time period and may generate some statistics to be transmitted to entity 100. Furthermore, the base station comprises a memory 340, such as a read-only memory, a flash memory, a random access memory, a mass storage or the like, storing suitable program codes to be executed by the pre-processor in order to implement the functionalities of the base station described above and further below. Entity 100 can detect an outage of a network element 300 in different ways: It can detect an alarm generated by the outage sensor 320 in the network element, based on pre-processed data received from the pre-processor or the processor 120 of entity 100 can itself process the received data in order to detect an outage.

Entity 100 can further communicate with a network planning tool 200 which comprises an input/output unit 210 with a transmitter 211 and a receiver 212 for transmitting information to outside the network planning tool and for receiving information from outside the network planning tool respectively. The network planning tool may comprise a network model module 230. With the network model module 230 it is possible to simulate an outage of a managed network element for each of the network elements, and with a compensation planning module 220 the information needed for compensation can be generated. The network planning tool 200 is used to generate the initialization data provided in the outage database 130 and the data generated by the network planning tool 200 are used in the outage database 130 as initial values, before, with the use of the continuously received operating parameters and an evaluation of the compensation rules, the database is updated.

In the following, an example is shown how the data in the outage database may look like. As discussed above, the database comprises three major fields, the identity of the network element, the outage detection rules and the outage compensation rules.
Record #111
Id Field:
  base225-cell1
Detection Field:
  AND rule_daytime_on_bytes_transferred(param_threshold=50 kbyte, param_timer=10 min) AND rule_nighttime_on_bytes_transferred(param_threshold=50 kbyte, param_timer=20 min) AND rule_handover_failure(param_neighbor=base226-cell3,param_threshold=20%, param_timer=10 min)
Compensation Field:
  AND Action_tilt_set(param_neighbor=base226-cell3, tilt=4 deg) AND Action_InterRAT_Handover_Margin(param_cell=base225-cell2,param_threshold=16 dB)
  AND
  Optimization_Capacity_and_Coverage(param_nodes=[base224,base225,base227],
  param_type="coverage_priority")
  Config_Update_on_Fix(param_nodes=[base224, base225,base227])
  Rule_Update_on_Completion(param_rules=[111])
Record #112 (Same Base Station, but Different Cell)
Id Field:
  base225,base225-cell1,base225-cell2
Detection Field:
  AND rule_daytime_on_bytes_transferred(param_threshold=50 kbyte, param_timer=10 min)
  AND rule_nighttime_on_bytes_transferred(param_threshold=50 kbyte, param_timer=20 min)
  AND rule_handover_failure(param_neighbor=base227-cell1,param_threshold=30%,param_timer=10 min)
Compensation Field:
  AND Action_tilt_set(param_neighbor=base227-cell1, tilt=6 deg)
  AND Action_InterRAT_Handover_Margin(param_cell=base225-cell2,param_threshold=16 dB)
  AND
  Optimization_Capacity_and_Coverage(param_nodes=[base224,base225,base227],
  param_type="coverage_priority")
  Config_Update_on_Fix(param_nodes=[base224, base225, base227])
  Rule_Update_on_Completion(param_rules=[112])
Record #113 (Same Base Station Including all of its Cells)
Id Field:
  base225-cell2
Detection Field:
  AND rule_daytime_on_bytes_transferred(param_threshold=50 kbyte, param_timer=5 min)
  AND rule_nighttime_on_bytes_transferred(param_threshold=50 kbyte, param_timer=10 min)
  AND rule_handover_failure(param_neighbor=base226-cell3,param_threshold=20%, param_timer=10 min)
  AND rule_handover_failure(param_neighbor=base227-cell1,param_threshold=30%,param_timer=10 min)
Compensation Field:
  AND Action_tilt_set(param_neighbor=base227-cell1, tilt=6 deg)
  AND Action_InterRAT_Handover_Margin(param_cell=base225-cell2,param_threshold=16 dB)
  AND
  Optimization_Capacity_and_Coverage(param_nodes=[base224,base225,base227],
  param_type="coverage_priority")
  Config_Update_on_Fix(param_ nodes=[base224, base225,base227])
  Rule_Update_on_Completion(param_rules=[111,112, 113])

From the above description it can be seen that the rules in action are templates which are instantiated with the parameters taken from the outage database and then the instantiated detection rules are placed on a time scheduled queue. The event measurement flows from the network elements are continuously pre-processed and the key performance indicators, KPIs or counters, are generated. By way of example, when the rule scheduler triggers a particular rule such as one of the rules defined in record #111, rule_daytime_on_bytes_transferred(param_threshold=50 kbyte, param_timer=10 min) then a KPI on the number of bytes transferred to or from base225-cell1 in the past ten minutes is evaluated by the processing unit and the rule is scheduled again according to the time parameter. Compound rules, which may comprise several rule instances are evaluated as soon as all rule instances referenced are triggered. The rules may trigger the actions, which then can be revoked upon fixing the problem or based on the evaluation of further rules, when the KPIs are back to normal level. The learning nature of the database can be seen in the "Rule_Update_on_Completion" action, which may be even triggered in normal circumstances, just based on the continuous evaluation of rules. The outage database may include settings for the self-optimization procedures that are continuously running in the cellular network. The settings are mostly high-level, policy-type switches or weights placed in the cost function of optimization. Such switches can be:

"Switch OFF optimization=[base224,base225]"—e.g. in cases when outage cannot be compensated for "Capacity priority=geo-location"—e.g. in densely deployed network, where VIP customers were lost "Coverage priority"—e.g. in case no alternative RAT available.

Coverage and capacity optimization (CCO) primarily manipulates the antenna tilts in order to provide sufficient field strength and cell isolation at the same time. These simultaneous requirements contradict each other, so CCO needs to find the trade-off. Even more degrees of freedom are added to the optimization with smart antennas, where azimuth direction and potentially both elevation and azimuth beamwidths of antennas can be electronically set. Especially in heterogeneous networks (with mixed macro, micro and pico cells) transmit power of cells are also variable parameters in CCO.

The cost function of CCO may be a weighted sum of the KPIs mentioned earlier. The optimization may involve several feedback loops, a loop may slowly fine-tune to improve channel quality and field strength with small steps, while a primary loop adjusts parameters to improve the drop call and handover related KPIs.

Figure 6:
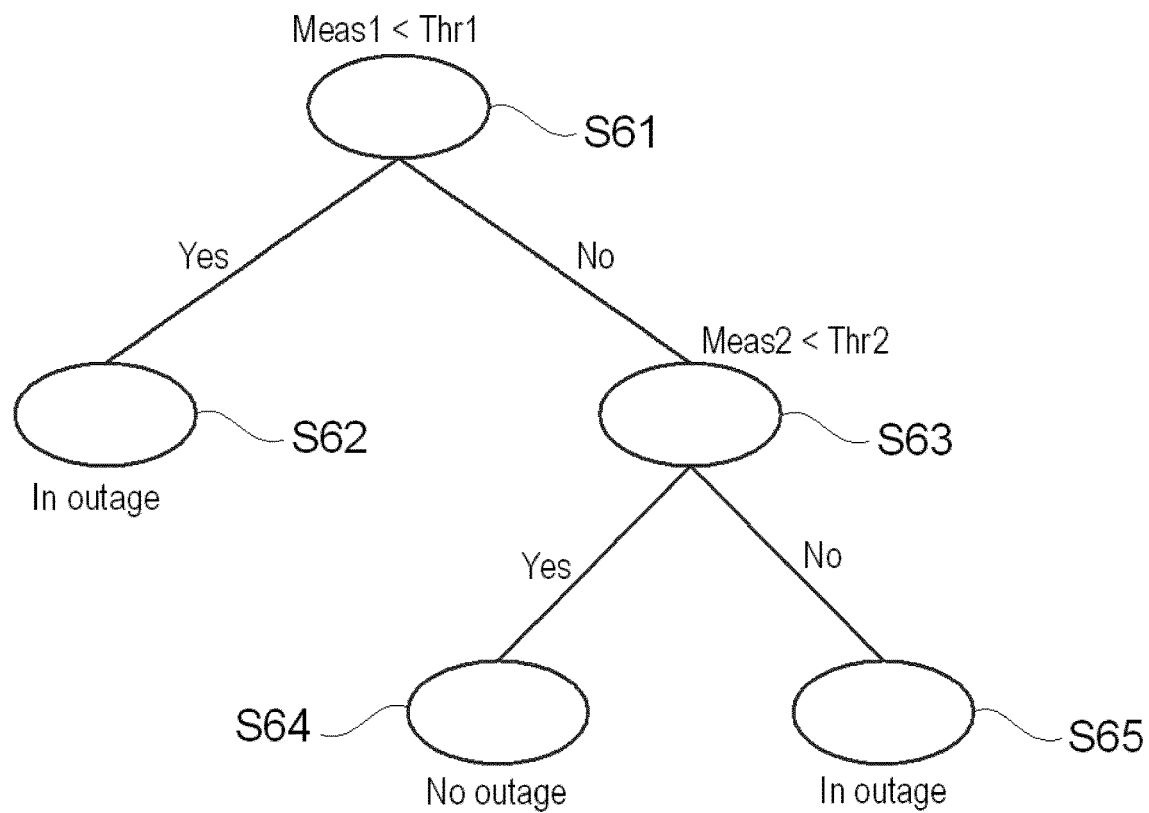
FIG. 6 schematically indicates an example how it is detected whether an outage in a network element has occurred or not.

FIG. 6 shows an example of when an outage is detected for a network element based on the received current operating parameters. The first operating parameter checked in the example in step S61 may be the failure rate of a neighboring cell. If the failure rate of a neighboring cell is smaller than a first threshold, it may be determined in step S62 that the current cell is in outage. If the failure rate of the neighboring cell is larger than the first threshold in step S61, it may be determined in a first step that there is no outage. In step S63, another operating parameter is checked, by way of example the number of attached users of the current cell. If the number of currently attached users is smaller than a threshold, it may be determined that no outage is present (step S64). If, however, the number of attached users is larger than a threshold, it may be determined in step S65 that the monitored cell is in outage. FIG. 6 is an earlier example for the evaluation of the hierarchical rule set that leads to outage detection.

In the following, it will be explained in more detail how the outage database is used for detecting an outage. The current operating parameters are received from the network elements 300. Entity 100 monitors the cell state variables and key performance indicators such as the cell load, a radio link failure counter, a handover failure rate, an intercell interference or the number of blocked or dropped calls. Furthermore, measurements from mobile entities such as the Reference Signal Received Power, RSRP, or failure reports generated by the mobile entity might be monitored. Periodically, entity 100 steps through the policy rules and compares the values of the received current operating parameters if they are in an acceptable range. Furthermore, parameters of triggering timers explained in more detail further below in connection with FIG. 5 and thresholds are read from the outage database. Events are observed which may indicate a cell outage. Certain alarms received from a network element by obviously mean an outage, but a sudden change of another parameter such as a state variable, may also indicate a possible failure, even if the value is in an acceptable range.

Figure 3:
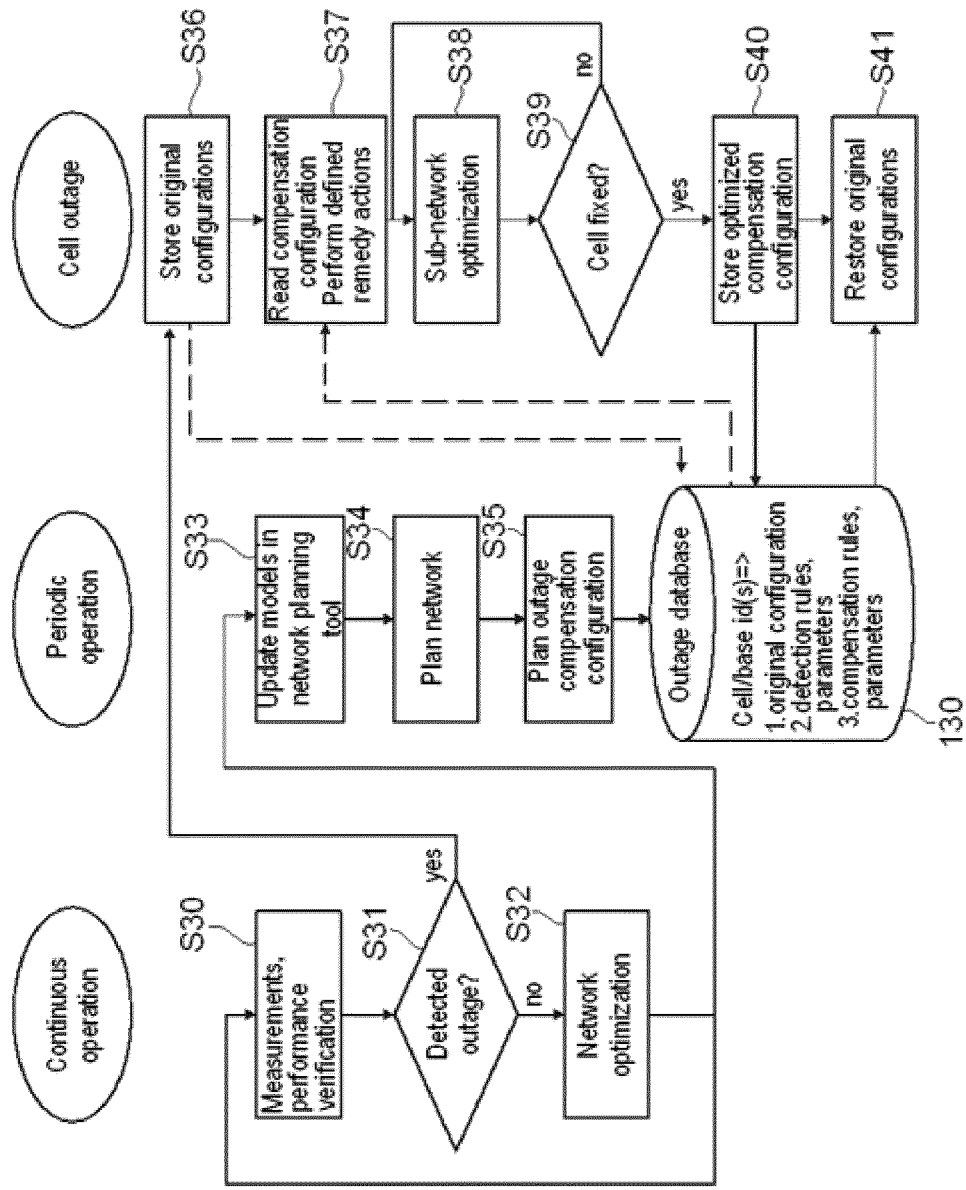
FIG. 3 is a flowchart illustrating a detection and compensation of a network element in a cellular network.

Referring to FIG. 3, the different steps carried out at the entity 100 controlling the cell outage are explained in more detail. The steps carried out for outage detection and compensation can be categorized in continuous operation steps, periodic operation steps and cell outage steps when an outage has been detected. As mentioned above and as symbolized by step S30, the current operating parameters of the network elements 300 are continuously received and it is checked based on the acceptable ranges provided by the different operating parameters or based on a change of a variable whether an outage is detected or not (step S31). If no outage is detected in step S31, the operating parameters describing an error-free operation, also named first operating parameters hereinafter, are used for network optimization and the database can be updated in step S32. By way of example, the current operating parameters are analyzed over time and statistical values such as mean values and standard deviations can be determined. Based on the determined statistics, the outage detection rules indicating when an outage occurs can be updated and the received current values can be compared to the expected values which describe a normal operation of a corresponding network element. Based on the current situation of the network, a network optimization can be carried out. In this context, it may happen that the network configuration changes as the traffic in the different cells changes. By way of example, a cell load over time may be provided for the different days of a week or new network elements may be added to the cellular network. These different pieces of information can be used to update the models used in the network planning tool 200 in step S33 and the network may be planned in step S34. The network plan describing the exact location of the different network elements and their interaction can be generated and updated in step S34. As can be deduced from FIG. 3, steps S33 and S34 can be performed at regular intervals. Based on the models and on the planned network, it is possible to plan the outage compensation for the different network elements.

As described above inter alia in connection with FIG. 8, it has to be determined whether an outage of a network element is compensated for and if the outage should be compensated for which compensating elements to compensate for the outage of one of the network elements. Referring to the embodiment of FIG. 8, this means that for each of the network elements it is determined which network elements are used, such as network elements 300b-300g in order to compensate for an outage of network element 300a. The outage compensation configuration generated in step S35 including the outage compensation rules are then fed into the outage database 130. In the embodiment shown in FIG. 8, the coverage of each base station may be increased in order to also cover the area covered by the base station in outage 300a.

If an event is detected in step S31, the outage compensation rules which can be applied are detected. To this end, the outage compensation rules are identified for the network element in outage before the compensating parameters at these compensating network elements can be used. The original configuration for the compensating network elements are stored in step S36 so that they can be re-introduced after the outage compensation is completed and the network element in outage has recovered. In this step S37, the outage compensation rules are read from the outage database, the compensation rules are applied and the compensation parameters are set accordingly. Furthermore, it is possible to notify any real-time coverage and capacity optimization loop that the cells in outage and the cells designated for compensation are not available for optimization. The compensating network elements are adapted based on the compensation parameters and in step S38, the network optimization is carried out in such a way that the compensating network elements are optimized that e.g. either the coverage or the capacity or the coverage and the capacity are optimized with the cost function stored in the database 130. In step S39 it is then checked whether the network element for which the outage has been detected has been fixed. As long as the network element in outage is under repair, the optimization can be carried out. If it is detected in step S39 that the network element in outage has been repaired, the optimized compensating parameters determined with the optimization of the cost function can be stored as new compensating parameters in the database 130. These newly optimized compensating parameters can be used as starting values in a future outage of the same network element (step S40). In step S41 the original configurations stored in step S36 before the outage compensation can be re-stored in the compensating network elements. Furthermore it is possible to notify any real-time coverage and capacity optimization loop that the cell or cells in outage and the cells used for compensation are available again. The storing of the optimized compensation parameters may only be carried out after a verification step in which it is checked whether the network has improved after the cell in outage has recovered. By way of example the coverage and capacity optimization (CCO) described above may be carried out. If it is determined in the verification step that the situation has not improved, the optimized parameters are not stored in the database.

In the following, the initialization of the outage database will be shortly explained. The outage detection rules or outage detection policy including the parameters and definitions of the normal operation are set together with the specific outage detection rules and parameters, wherein these outage detection rules are specifically set for each managed network element. Using the network planning tool, it is possible to simulate the outage of each of the network elements for each cell or base station node or set of nodes. Furthermore, it is possible to examine various traffic and user mobility scenarios based on a simulation. Using the results of the simulation, the other nodes or network elements can be identified which are needed as compensating elements together with their compensating parameters. The basic compensation configuration is extracted from the simulator module and the parameters are stored in the outage database as compensation parameters which are recalled in case of an outage.

The maintenance of the outage database can be continuously updated by monitoring the network element specific variables in real time and to update the statistics such as mean values and standard deviation carried out on the operating parameters or variables. Furthermore, trends may be analyzed and the daily profile models and policies may be updated accordingly in order to reflect the latest current operating parameters. The details measurements may be stored only at the node itself and at a temporary way and only pre-processed and/or compressed data pre-processed by pre-processor 330 may be sent periodically to the outage database. In another embodiment, the analysis and processing of the current operating parameters is carried out at the entity 100. The received data may be accumulated over the users seen at the corresponding network element. The outage compensation rules and the parameters and configuration settings stored in the outage database emphasize the latest observations from the network and they are customized to individually managed network elements as more and more measurements and events are collected.

Figure 4:
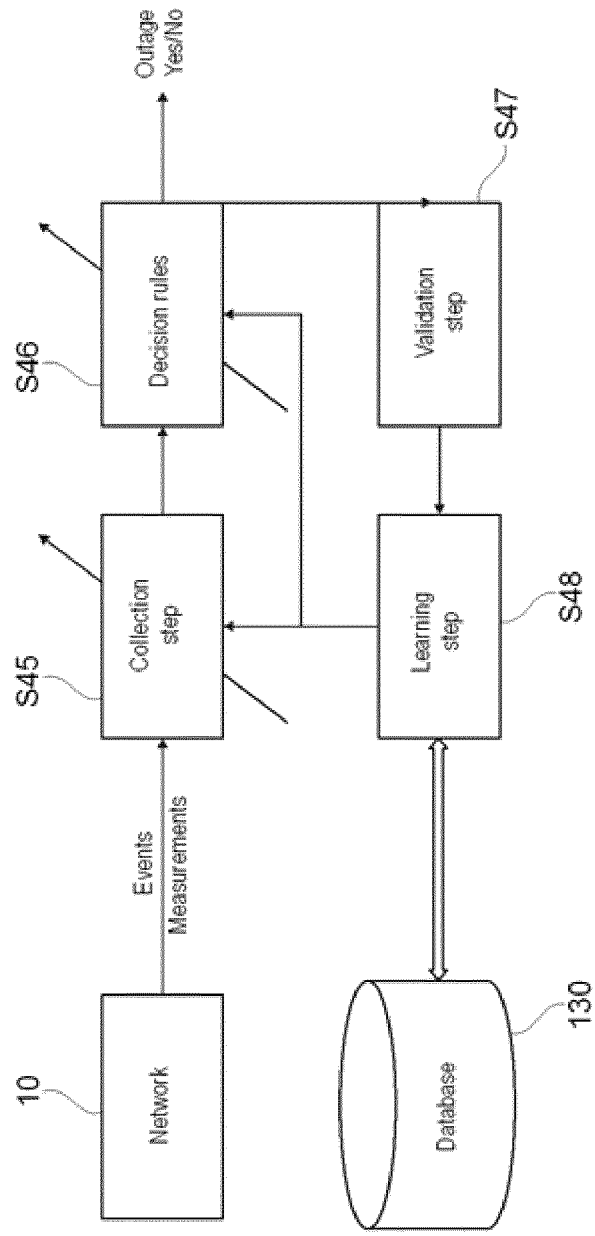
FIG. 4 indicates a flowchart including steps used to update an outage database used for controlling an outage of a network element.

FIG. 4 summarizes how the outage database 130 is updated. The cellular network 10 symbolized by the module shown in FIG. 4 provides events and measurements such as the current operating parameters, the operating parameters including performance measurement data such as KPI and/or configuration parameters. The current operating parameters are collected in step S45. Based on the collected information, statistical values can be calculated, e.g. in dependence on time. This collection step helps to improve the first operating parameters in the outage database and in step S46, the decision rules can be updated in order to reflect the changing current operating parameters. By way of example, when a traffic at a network element heavily increases, the outage detection rules need to be adapted in order to detect when a very high load or very low load is an indicator for an outage. Based on the detection rules, it is checked whether an outage is detected as discussed above in connection with FIG. 3. In step S47, an evaluation of the outage detection rules and of the outage compensation rules can be carried out. By way of example, when the network performance of the cellular network has improved after the application of the compensating parameters compared to the situation before the compensating parameters have been applied, the optimized operating parameters of the compensating elements can be stored and used for future outage compensation of the same network element. Furthermore, the outage detection rules may be evaluated. For the evaluation of the outage detection rules, it may be checked whether other operating parameters or an operating status of the network element indicates an outage. If the outage is confirmed, the outage detection rules, which led to the detection of the outage, may be amended in such a way that the validity of the outage detection rule is increased. Based on the evaluation step S47, the entity 100 learns about the validity of the outage compensation rules and the outage detection rules in step S48. This information is fed into the database 130 where the outage compensation rules and the outage detection rules can be amended accordingly. This information is then also used in the collection step S45 and decision step S46, where it is decided whether an outage is detected or not and whether or how the outage should be compensated for.

Anytime an outage sensor triggers, the triggers can be validated by observing the cell state after the trigger and before any remedy action is taken. If the outage trigger is valid, then there should be not traffic seen in the cell for the following period of time. The validation can be done in different ways, either by observing a significant decrease in the carried traffic, a certain time period after the trigger, by detecting an alarm from the node that unambiguously indicates lack of service or by detecting continuous outage triggers coming from the node.

Figure 5:
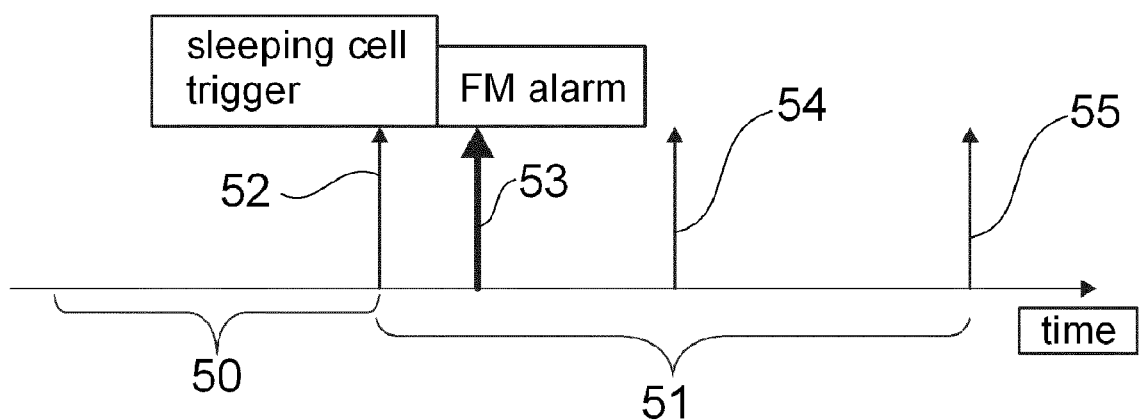
FIG. 5 schematically illustrates how it is confirmed that an outage occurs at a network element.

FIG. 5 shows an example for this embodiment when a sleeping cell trigger is received at the entity 100 for the first time during a detection time 50. In order to build statistics, an appropriately large sample population is needed. Events and measurements connected to user terminals make up the sample population, and one needs to wait for a while to gather enough samples or to conclude that an outage in lack of receiving any events or measurements is detected. So the detection time depends on the normally expected rate of event/measurement inflow, which can be learnt and customized to monitored network elements. The cell state after the trigger is observed. In the example shown in FIG. 5, the sleeping triggers such as sleeping triggers 52, 54 and 55 are continuously received. When it is received the first time, time period 51 is used to validate whether an outage has occurred for this cell or network element. In the example shown, a fault management alarm 53 is received in this time period which would confirm the outage. By setting the time period 51 or trigger time, the sensitivity of the outage detection can be influenced. It mainly depends on the type of detection rule what type of validation is applied. The validation methods can be formulated as set of rules, e.g. involving traffic and user counters and watchdog timers with custom, cell and hour-of-the-day specific durations. Furthermore, it is possible, if the validity of the trigger is verified and confirmed, that the corresponding detection rule which led to the detection of the outage can be reinforced, e.g. by increasing a score value of the corresponding outage detection rule. If the validity of the trigger turns out to be false, then the sensitivity settings of the corresponding detection rules can be updated, e.g. by increasing or decreasing the threshold and the rules.

The update of the outage compensation rules and policies in the outage database can include the following steps:

Any time a cell outage compensation is performed and the remedy actions and configuration are further optimized, the changes can be evaluated and validated and, if necessary, the stored policies and configurations updated with the involved network elements in the outage database accordingly. If the measured operating parameters have improved after the adjustment of the remedy actions and configurations, then the remedy action in the database can be updated to the new settings resulting from the adjustments of the remedy configuration. If the KPIs operating parameters degraded after the adjustment of the remedy action, the original rules and configuration settings are kept in the database. Furthermore, when the network is updated or modified, e.g. when cells and radio base stations are added or removed, the relevant part of the database should be updated as well.

As can be deduced from FIG. 2 above, the measurement and event logs are stream transferred to a central node or entity 100 that is responsible for the outage detection and compensation functionality. The data storage and processing logic is implemented centrally and may be part of the OSS/NMS (Network Management System). When the entity 100 is part of the OSS/NMS, then the latter can be in full control of outage detection and compensation. However, it should be understood that the entity 100 need not necessarily be part of the OSS or NMS. It can also be implemented as a separate new node in the cellular network.

The processing logic for outage detection may be partially implemented in the network elements 300 such as the radio base stations or may be contained in the entity 100. Instead of forwarding all measurements and events to the entity 100, e.g. OSS or NMS, the base station 300 can pre-process the measurements and events and it generates statistics and applies thresholds when triggering warnings. The policies and logic in the base station 300 are still managed by a central or regional node which has a regional view of the services and access technologies of the local area. As discussed above in connection with FIG. 3, the outage database can be created at the time of network planning and rollout. It contains the node configuration for non-operation and it initially also contains general policies for cell outage detection and compensation. These policies are then made cell specific and traffic specific by the aid of the radio network planning tool, including the network model module 230.

Figure 7:
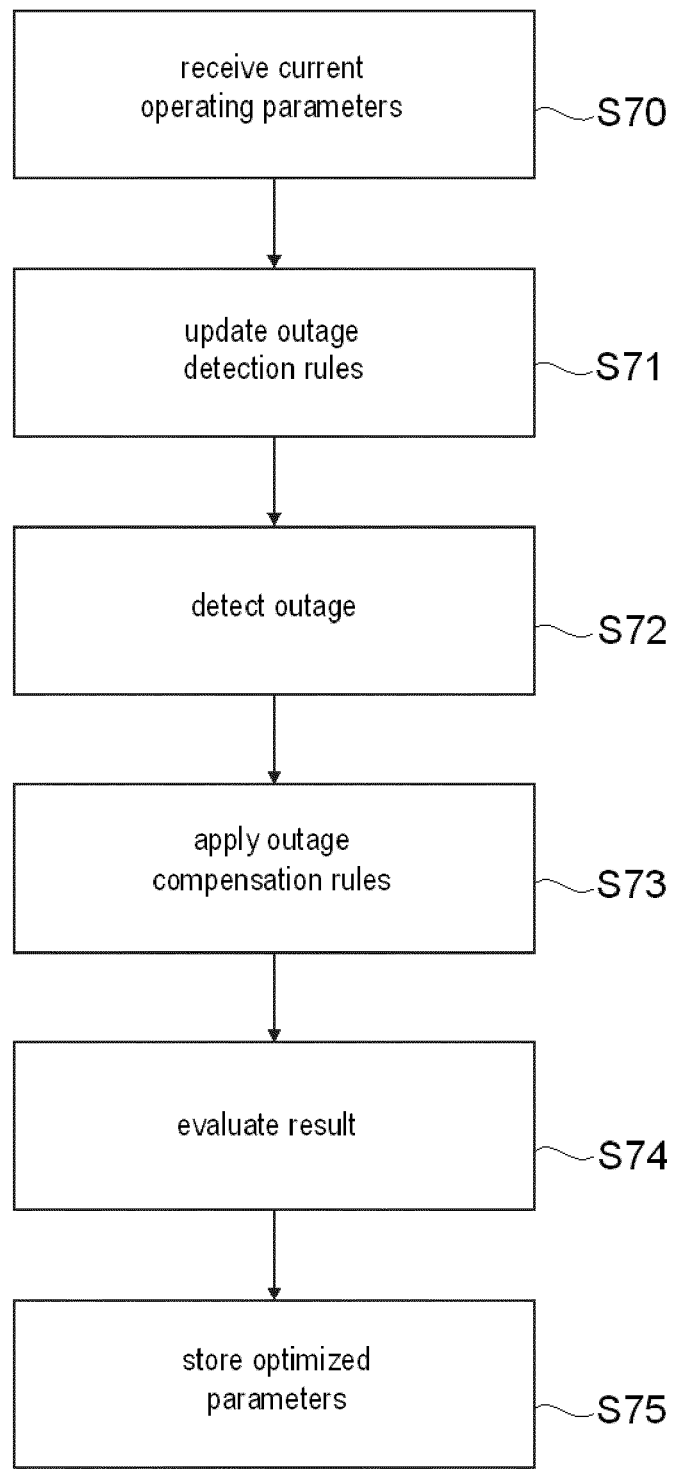
FIG. 7 is a flowchart illustrating steps carried out to detect an outage of a network element and to compensate for the outage.

FIG. 7 summarizes the control of an outage according to one embodiment.

In step S70, the current operating parameters are continuously received and based on these parameters, the outage detection rules can be updated together with the first operating parameters which indicate an error-free use of a corresponding network element (step S71). If in step S72 an outage is detected based on the current operating parameters and the outage detection rules, the outage compensation rules for the network elements for which the outage was detected can be determined and applied in step S73. The application of the outage compensation rules includes the calculation of optimized operating parameters used for the compensation. The result of the application of the compensation rules is then evaluated in step S74 and if the situation after the outage compensation has not degraded but improved, the optimized operating parameters may be stored in the compensation rules in step S75.

From the above discussion of the invention, some general conclusions can be drawn:

The received current operating parameters for one network element can be analyzed over time in order to determine a range of the first operating parameters for which an error-free operation of said one network element is assumed. The range of the first operating parameters is then adapted based on the received current operating parameters.

In this context, it is possible to detect an outage for said one network element when at least one of the current operating parameters is outside the determined range. Furthermore, an outage may be detected when at least one of the current operating parameters changes for a defined time period by more than a threshold. When one of the measured operating parameters or KPI changes rapidly, this may be an indication of an outage.

The compensation rules can furthermore include information whether, when an outage is detected for one of the network elements, the outage of said one network element should be compensated for or not. Furthermore, the compensation rules can include information whether said one network element can be used as compensating network element. By way of example, a cell providing additional capacity in a cellular network may not be compensated for in case of an outage, whereas a cell providing primary coverage needs to be compensated for. Furthermore, it is possible that a cell may not be allowed to change its service coverage or an indoor cell may not be allowed to compensate for an outdoor cell and vice versa.

The outage detection for said one network element can comprise the following steps. The compensating network elements used to compensate for the outage of said one network element are identified, the currently used operating parameters of the compensating network elements are stored and the compensating network elements are configured using the compensation parameters stored in the outage database for said one network element. Furthermore, the optimized operation parameters for the compensating network elements are calculated. When the outage is overcome, the compensating network elements are reconfigured with the stored operating parameters and the calculated optimized operating parameters are stored for said one network element for a future outage of said one network element. Preferably, the storing of the optimized operating parameters can be carried out only after an evaluation of the situation is positive. One might use two configurations and CCO instances to be stored in the database. The normal operation, when a network configuration is present, which is slowly optimized by a CCO instance which is characterized by a set of actuator variables and goal function parameters. Furthermore the outage compensating configuration of the network segment and a related CCO instance is present, which go in place when the outage compensation is activated. If the outage lasts long enough then the related CCO instance can improve the compensation configuration and can also lead to updated detection rules, which are also stored in the outage database.

Furthermore, it is possible that when the outage for one of the network elements is detected to validate an operating status of said one network element for which the outage was detected. If the outage for said one network element is confirmed by the operating status, a validity of the detection rule that was used to identify the outage can be increased. Furthermore, when an outage is detected for said one network element, a timer is initialized for said one network element and it is checked within a time period defined by the timer whether another of the outage detection rules indicates and outage of said one network element. Only when another of the outage detection rules indicates an outage of said one network element, the outage of said network element may be finally determined or confirmed and a validity of an outage compensation rule can be increased.

Observations from the regular daily operation (the current operating parameter) provides input to network optimization and consequently leads to cell and traffic specific statistics, which allow the fine-tuning of policies stored in the outage database. The measurements can also be fed into a radio planning tool which can re-plan the outage compensation actions defined in the outage compensation rules.

When an outage occurs in the network, the remedy actions of outage compensation are taken from the outage database and the performance of outage compensation is evaluated. The latest, optimized detection and compensation setting drawn from real-life outage cases, lead to improved policies in the database. The present invention provides a central or at least regional control of the outage detection and compensation. This is necessary as several node or even different RATs are typically involved in outage compensation. Some of the processing can also be performed locally, either in the network elements such as the base stations 300 or the network planning tool 200. In this case, the outage sensors are measurements and event pre-processors in the network elements and the parameters and configuration are downloaded from the central entity 100 which employs the outage database as accumulated expert knowledge.

The present outage compensation and the detection uses an outage database which accumulates all the operator/traffic and cell-specific knowledge about outages in a particular cellular network or part of a network. This database is continuously and real-time enhanced with information learned from the daily network operations and it speeds up the remedy actions that need to be done in order to recover from failures of network elements.

The invention claimed is:

1. A method for controlling an outage of a network element in a cellular network using an outage database; the outage database containing, for each of a plurality of the network elements controlled by the cellular network, at least the following network element dependent information: first operating parameters describing an error free operation of the corresponding network element, outage detection rules indicating when an outage for the corresponding network element is present, outage compensation rules indicating how the outage of the corresponding network element should be compensated, the outage compensation rules including compensation parameters to be used by compensating network elements in order to compensate for the outage of one of the network elements; the method comprising:

continuously receiving current operating parameters for a plurality of network elements;

updating the first operating parameters and the outage detection rules for the plurality of network elements taking into account the current operating parameters;

detecting an outage for one of the network elements by comparing the received current operating parameters to the outage detection rules for the one network element; and in response to detecting an outage for the one network element:

determining and applying the outage compensation rules for the one network element, wherein applying the compensation rules comprises optimizing the compensation parameters in order to calculate optimized operating parameters for the compensating network elements used to compensate for the outage of the one network element;

evaluating the application of the compensation rules; and storing, based on the evaluation, the optimized operating parameters in the compensation rules as starting parameters for a future optimization of the compensation parameters in case of an outage of the one network element.

2. The method of claim 1, wherein the received current operating parameters for the one network element are analyzed over time in order to determine a range of the first operating parameters in which an error free operation of the one network element is assumed; and wherein the range of the first operating parameters is adapted based on the received current operating parameters.

3. The method of claim 2, wherein an outage is detected for the one network element when at least one of the current operating parameters is outside the determined range or when a value of at least one of the current operating parameters changes over a defined time period by more than a threshold.

4. The method of claim 1, wherein the compensation rules include:

information on whether, when an outage is detected for one of the network elements, the outage of the one network element should be compensated for at all or not; and information on whether the one network element can be used as compensating network element.

5. The method of claim 1, wherein the detecting an outage for the one network element comprises:

identifying the compensating network elements used to compensate for the outage of the one network element;

storing the currently used operating parameters of the compensating network elements;

configuring the compensating network elements using the compensation parameters stored in the outage database for the one network element; and calculating the optimized operating parameters for the compensating network elements;

wherein, when the outage of the one network element is overcome:

the compensating network elements are reconfigured with the stored operating parameters; and the calculated optimized operating parameters are stored for the one network element for a future outage of the one network element; and an evaluation of the application of the optimized operating parameters is positive.

6. The method of claim 1:

wherein, in response to detecting the outage for one of the network elements, an operating status of the one network element is validated after the outage is detected; and wherein, in response to the outage of the one network element being confirmed by the operating status, a validity of the detection rule that was used to identify the outage is increased.

7. The method of claim 1:

wherein the outage database is initialized by simulating the outage of different network elements in the cellular network using a radio planning tool; and wherein the compensating network elements and the initial compensation parameters are identified based on the simulation.

8. The method of claim 1:

wherein, in response to detecting an outage for the one network element, a timer is initialized for the one network element, and it is checked within a time period defined by the timer whether another of the outage detection rules indicates an outage of the one network element;

wherein only when another of the outage detection rules indicates the outage of the one network element, the outage of the one network element is determined and a validity of the outage compensation rule is increased.

9. An apparatus configured to control an outage of a network element in a cellular network, comprising:

an outage database; the outage database containing, for each of a plurality of the network elements controlled by the cellular network, at least the following network element dependent information:

first operating parameters describing an error free operation of the corresponding network element;

outage detection rules indicating when an outage for the corresponding network element is present;

outage compensation rules indicating how the outage of the corresponding network element should be compensated, the outage compensation rules including compensation parameters to be used by compensating network elements in order to compensate for the outage of one of the network elements;

processing circuitry;

memory containing instructions executable by the processing circuitry whereby the apparatus is operative to:

continuously receive current operating parameters for a plurality of network elements;

update the first operating parameters and the outage detection rules for the plurality of network elements taking into account the current operating parameters;

detect an outage for one of the network elements by comparing the received current operating parameters to the outage detection rules for the one network element;

in response to detecting an outage for the one network element:

determine and apply the outage compensation rules for the one network element, wherein applying the outage compensation rules comprises optimizing the compensation parameters in order to calculate optimized operating parameters for the compensating network elements used to compensate for the outage of the one network element;

evaluate the application of the compensation rules; and store the optimized operating parameters in the compensation rules as starting parameters for a future optimization of the compensation parameters based on the evaluation.

10. The apparatus of claim 9, wherein the instructions are such that the apparatus is operative to:

analyze the received current operating parameters for the one network element over time in order to determine a range of the first operating parameters in which an error free operation of the one network element is assumed;

adapt the range of the first operating parameters based on the received current operating parameters.

11. The apparatus of claim 9, wherein the instructions are such that the apparatus is operative to detect the outage for the one network element when at least one of the current operating parameters is outside the determined range, or when a value of at least one of the current operating parameters changes over a defined time period by more than a threshold.

12. The apparatus of claim 9, wherein the instructions are such that the apparatus is operative to, in response to detecting the outage for one of the network elements:

validate an operating status of the one network element; and in response to the outage of the one network element being confirmed by the operating status, increase a validity of the detection rule that was used to identify the outage.

13. The apparatus of claim 9, wherein the compensation rules include:

information on whether, when an outage is detected for one of the network elements, the outage of the one network element should be compensated for at all or not; and information on whether the one network element can be used as compensating network element.

14. The apparatus of claim 9, wherein the instructions are such that the apparatus is operative to detect the outage for the one network element by:

identifying the compensating network elements used to compensate for the outage of the one network element;

storing the currently used operating parameters of the compensating network elements;

configuring the compensating network elements using the compensation parameters stored in the outage database for the one network element;

calculating the optimized operating parameters for the compensating network elements;

wherein, when the outage of the one network element is overcome:

the compensating network elements are reconfigured with the stored operating parameters; and the calculated optimized operating parameters are stored for the one network element for a future outage of the one network element; and an evaluation of the application of the optimized operating parameters is positive.

15. The apparatus of claim 9:

wherein the instructions are such that the apparatus is operative to initialize the outage database by simulating the outage of different network elements in the cellular network using a radio planning tool; and wherein the compensating network elements and the initial compensation parameters are identified based on the simulation.

16. The apparatus of claim 9, wherein the instructions are such that the apparatus is operative to:
in response to detecting an outage for the one network element, initialize a timer for the one network element, and check, within a time period defined by the timer, whether another of the outage detection rules indicates an outage of the one network element;
wherein only when another of the outage detection rules indicates the outage of the one network element, the outage of the one network element is determined and a validity of the outage compensation rule is increased.

17. A non-transitory computer readable recording medium storing a computer program product for controlling an outage of a network element in a cellular network using an outage database; the outage database containing, for each of a plurality of the network elements controlled by the cellular network, at least the following network element dependent information: first operating parameters describing an error free operation of the corresponding network element, outage detection rules indicating when an outage for the corresponding network element is present, outage compensation rules indicating how the outage of the corresponding network element should be compensated, the outage compensation rules including compensation parameters to be used by compensating network elements in order to compensate for the outage of one of the network elements; the computer program product comprising software instructions which, when run on processing circuitry of an entity the cellular network, cause the entity to:
continuously receive current operating parameters for a plurality of network elements;
update the first operating parameters and the outage detection rules for the plurality of network elements taking into account the current operating parameters;
detect an outage for one of the network elements by comparing the received current operating parameters to the outage detection rules for the one network element; and
in response to detecting an outage for the one network element:
determine and apply the outage compensation rules for the one network element, wherein applying the compensation rules comprises optimizing the compensation parameters in order to calculate optimized operating parameters for the compensating network elements used to compensate for the outage of the one network element;
evaluate the application of the compensation rules; and
store, based on the evaluation, the optimized operating parameters in the compensation rules as starting parameters for a future optimization of the compensation parameters in case of an outage of the one network element.

18. The non-transitory computer readable recording medium of claim 17, wherein the instructions are such that the instructions, when executed by the processing circuitry of the entity, cause the entity to:
analyze the received current operating parameters for the one network element over time in order to determine a range of the first operating parameters in which an error free operation of the one network element is assumed; and
adapt the range of the first operating parameters based on the received current operating parameters.

19. The non-transitory computer readable recording medium of claim 18, wherein the instructions are such that the instructions, when executed by the processing circuitry of the entity, cause the entity to detect an outage for the one network element when at least one of the current operating parameters is outside the determined range or when a value of at least one of the current operating parameters changes over a defined time period by more than a threshold.

20. The non-transitory computer readable recording medium of claim 17, wherein the instructions are such that the instructions, when executed by the processing circuitry of the entity, cause the entity to:
in response to detecting the outage for one of the network elements, validate, after the outage is detected, an operating status of the one network element; and
in response to the outage of the one network element being confirmed by the operating status, increase a validity of the detection rule that was used to identify the outage.

* * * * *